(12) United States Patent
Belelie et al.

(10) Patent No.: US 7,905,948 B2
(45) Date of Patent: *Mar. 15, 2011

(54) PHASE CHANGE INK COMPOSITIONS

(75) Inventors: Jennifer L. Belelie, Oakville (CA); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 447 days.

This patent is subject to a terminal disclaimer.

(21) Appl. No.: 11/893,072

(22) Filed: Aug. 14, 2007

(65) Prior Publication Data

US 2009/0046134 A1    Feb. 19, 2009

(51) Int. Cl.
C09D 11/00    (2006.01)
(52) U.S. Cl. .................. 106/31.61; 106/31.29; 347/102
(58) Field of Classification Search .... 106/31.61–31.63, 106/31.29–31.31; 347/88, 99, 100, 102
See application file for complete search history.

(56) References Cited

U.S. PATENT DOCUMENTS

| | | | |
|---|---|---|---|
| 3,653,932 A | 4/1972 | Berry et al. | 106/31.29 |
| 4,390,369 A | 6/1983 | Merritt et al. | 106/31.3 |
| 4,484,948 A | 11/1984 | Merritt et al. | 106/31.3 |
| 4,684,956 A | 8/1987 | Ball | 347/88 |
| 4,851,045 A | 7/1989 | Taniguchi | 106/31.31 |
| 4,889,560 A | 12/1989 | Jaeger et al. | 106/31.29 |
| 4,889,761 A | 12/1989 | Titterington et al. | 428/32.1 |
| 5,006,170 A | 4/1991 | Schwarz et al. | 106/31.3 |
| 5,151,120 A | 9/1992 | You et al. | 106/31.29 |
| 5,195,430 A | 3/1993 | Rise | 100/168 |
| 5,221,335 A | 6/1993 | Williams et al. | 524/560 |
| 5,372,852 A | 12/1994 | Titterington et al. | 427/288 |
| 5,389,958 A | 2/1995 | Bui et al. | 347/103 |
| 5,496,879 A | 3/1996 | Griebel et al. | 524/320 |
| 5,621,022 A | 4/1997 | Jaeger et al. | 523/161 |
| 5,777,023 A * | 7/1998 | Pavlin | 524/590 |
| 6,547,380 B2 | 4/2003 | Smith et al. | 347/96 |
| 6,989,052 B1 * | 1/2006 | Wu et al. | 106/31.29 |
| 2006/0014852 A1 | 1/2006 | Loccufier et al. | |
| 2006/0132570 A1 * | 6/2006 | Odell et al. | 347/102 |
| 2007/0120910 A1 | 5/2007 | Odell et al. | |
| 2007/0120925 A1 | 5/2007 | Belelie et al. | |
| 2007/0123606 A1 | 5/2007 | Toma et al. | |
| 2007/0123723 A1 | 5/2007 | Odell et al. | |
| 2007/0123724 A1 | 5/2007 | Belelie et al. | |
| 2007/0142492 A1 * | 6/2007 | Odell et al. | 522/74 |

FOREIGN PATENT DOCUMENTS

| | | |
|---|---|---|
| EP | 0187352 | 7/1986 |
| EP | 0206286 | 12/1986 |
| WO | WO 94/04619 | 3/1994 |

OTHER PUBLICATIONS

English Abstract for German Patent Publication DE 4205713AL, Mar. 1996.
Kirk-Othmer Encyclopedia of Chemical Technology, 4th Ed., John Wiley & Sons, NY, vol. 8, "Dimer Acids," pp. 223-237, 1999.
U.S. Patent Application filed Jun. 28, 2006, of Peter G. Odell et al., entitled "Radiation Curable Ink Cntaining Gellant and Radiation Curable Wax," 51 pages, 5 drawing figures, U.S. Appl. No. 11/427,172, not yet published.

* cited by examiner

Primary Examiner — Matthew Luu
Assistant Examiner — Rut Patel
(74) Attorney, Agent, or Firm — Marylou J. Lavoie, Esq. LLC

(57) ABSTRACT

A phase change ink composition comprising (a) at least one curable monomer or prepolymer, (b) at least one gellant, (c) at least one hyperbranched polymer comprising at least one photoinitiating moiety, (d) a colorant, (e) optionally, a reactive oligomer; and (f) optionally, at least one low molecular weight photo initiator.

19 Claims, No Drawings

PHASE CHANGE INK COMPOSITIONS

CROSS-REFERENCE IS MADE TO THE FOLLOWING CO-PENDING APPLICATIONS

Copending application U.S. Ser. No. 11/290,328, filed Nov. 30, 2005, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference, discloses a process for preparing a compound of the formula

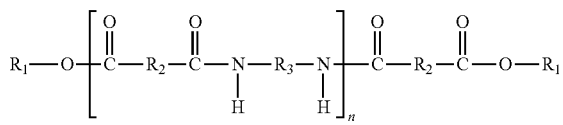

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

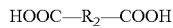

with a diamine of the formula

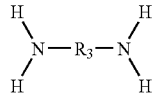

in the absence of a solvent while removing water from the reaction mixture to form an acid-terminated oligoamide intermediate; and (b) reacting the acid-terminated oligoamide intermediate with a monoalcohol of the formula

in the presence of a coupling agent and a catalyst to form the product.

Copending application U.S. Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, discloses a phase change ink comprising a colorant, an initiator, and an ink vehicle, said ink vehicle comprising (a) at least one radically curable monomer compound, and (b) a compound of the formula

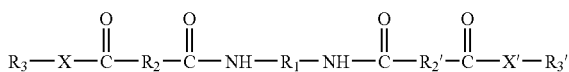

wherein $R_1$ is an alkylene, arylene, arylalkylene, or alkylarylene group, $R_2$ and $R_2'$ each, independently of the other, are alkylene, arylene, arylalkylene, or alkylarylene groups, $R_3$ and $R_3'$ each, independently of the other, are either (a) photoinitiating groups, or (b) groups which are alkyl, aryl, arylalkyl, or alkylaryl groups, provided that at least one of $R_3$ and $R_3'$ is a photoinitiating group, and X and X' each, independently of the other, is an oxygen atom or a group of the formula —$NR_4$—, wherein $R_4$ is a hydrogen atom, an alkyl group, an aryl group, an arylalkyl group, or an alkylaryl group.

Copending application U.S. Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is totally incorporated herein by reference, discloses a phase change ink comprising a colorant, an initiator, and a phase change ink carrier, said carrier comprising at least one radically curable monomer compound and a compound of the formula

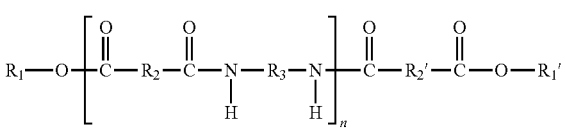

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1. Also disclosed herein is a method of printing with the phase change ink.

Copending application U.S. Ser. No. 11/289,615, filed Nov. 30, 2005, entitled "Radiation Curable Ink Containing A Curable Wax," with the named inventors Jennifer L. Belelie, et al., the disclosure of which is totally incorporated herein by reference, discloses a radiation curable ink comprising a curable monomer that is liquid at 25° C., curable wax and colorant that together form a radiation curable ink. This ink may be used to form images by providing the radiation curable ink at a first temperature; applying the radiation curable ink to the substrate to form an image, the substrate being at a second temperature, which is below the first temperature; and exposing the radiation curable ink to radiation to cure the ink.

BACKGROUND

Disclosed herein are phase change ink compositions. More specifically, disclosed herein are curable phase change ink compositions. Further, the present disclosure generally relates to curable inks, particularly curable, phase change inks, and their use in methods for forming images, particularly their use in ink jet printing. One embodiment is directed to a phase change ink composition comprising (a) at least one curable monomer or prepolymer, (b) at least one gellant, (c) at least one hyperbranched polymer comprising at least one photoinitiating moiety, (d) a colorant (e) optionally, a reactive oligomer; and (f) optionally, at least one low molecular weight photoinitiator.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents showthrough on the paper.

In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

Radiation curable inks generally comprise at least one curable monomer, a colorant, and a radiation activated initiator, specifically a photoinitiator, that initiates polymerization of curable components of the ink, specifically of the curable monomer. Photoinitiators are typically low molecular weight compounds, low molecular weight compounds generally being compounds having a molecular weight of from about 100 to about 1000 or from about 100 to less than about 800. The low molecular weight photoinitiator compounds are not substantially incorporated into the polymer matrix formed after polymerization of radiation curable ink compositions. As a result, residual photoinitiators and bi-products thereof can diffuse out of cured products and can be extracted. When used in certain applications, for example food packaging, and direct to paper printing, it is desirable to reduce the amount of or eliminate altogether extractable species present, for example to meet environmental, health and safety requirements.

U.S. Patent Publication 20060014852 (Loccufier et al.) the disclosure of which is totally incorporated herein by reference, discloses a radiation curable composition comprising a novel photoreactive polymer comprising a dendritic polymer core with at least one initiating functional group and at least one co-initiating functional group. Suitable radiation curable compositions are varnishes, lacquers, printing inks and radiation curable ink-jet inks. The dendritic polymeric core is preferably a hyperbranched polymer.

While known compositions and processes are suitable for their intended purposes, a need remains for improved photoinitiators. In addition, a need remains for improved phase change inks. Further, a need remains for photoinitiators that are soluble in, miscible in, or otherwise compatible with phase change ink vehicles. Additionally, a need remains for photoinitiators that lead to reduced odor when used in curable phase change inks prior to curing. There is also a need for photoinitiators that lead to reduced odor when used in curable phase change inks subsequent to curing. In addition, there is a need for photoinitiators that lead to reduced surface yellowing in images when used in curable phase change inks. Further, there is a need for photoinitiators that exhibit reduced migration through cured images when used in curable phase change inks. Additionally, there is a need for photoinitiators having improved affinity for phase change inks exhibiting a gel phase during the printing process. A need also remains for a photoinitiator having reduced volatility in itself and also having reduced volatility of its fragments. In addition, a need remains for photoinitiators that in themselves exhibit gellant characteristics. Further, a need remains for photoinitiators that have improved affinity for the ordered microstructure of the gel phase, as opposed to being excluded from that order. Additionally, a need remains for photoinitiators that are themselves curable. There further remains a need for phase change inks with reduced or eliminated amounts of post fusing extractable species. There further remains a need for phase change inks that can be tuned with respect to ink rheology independently from the selection of curable monomer, oligomer or prepolymer.

The appropriate components and process aspects of the each of the foregoing may be selected for the present disclosure in embodiments thereof.

SUMMARY

The present disclosure is directed to a phase change ink composition comprising (a) at least one curable monomer or prepolymer, (b) at least one gellant, (c) at least one hyperbranched polymer comprising at least one photoinitiating moiety, (d) a colorant (e) optionally, a reactive oligomer; and (t) optionally, at least one low molecular weight photoinitiator.

Also disclosed is a process which comprises (I) incorporating into an ink jet printing apparatus a phase change ink composition comprising (a) at least one curable monomer or prepolymer, (b) at least one gellant, (c) at least one hyperbranched polymer comprising at least one photoinitiating moiety, (d) a colorant (e) optionally, a reactive oligomer; and (f) optionally, at least one low molecular weight photoinitiator; (II) melting the ink; (III) causing droplets of the melted ink to be ejected in an imagewise pattern onto a substrate; and (IV) exposing the imagewise pattern to ultraviolet radiation.

DETAILED DESCRIPTION

The present disclosure is directed to a phase change ink composition comprising (a) at least one curable monomer or prepolymer, (b) at least one gellant, (c) at least one hyperbranched polymer comprising at least one photoinitiating moiety, (d) a colorant (e) optionally, a reactive oligomer; and (f) optionally, at least one low molecular weight photoinitiator.

Any desired or effective colorant can be employed in the phase change ink compositions herein, including dyes, pigments, mixtures thereof, and the like, provided that the colorant can be dissolved or dispersed in the ink vehicle. In embodiments, the colorant comprises a dye, a pigment, a curable olefin colorant, or a mixture thereof. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Nebzapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

The colorant is present in the phase change ink in any desired or effective amount to obtain the desired color or hue, in one embodiment at least about 0.1 percent by weight of the ink composition, and in another embodiment at least about 0.2 percent by weight of the ink composition, and in one embodiment no more than about 15 percent by weight of the ink composition, and in another embodiment no more than about 8 percent by weight of the ink composition, although the amount can be outside of these ranges.

The phase change ink compositions herein further optionally contain a low molecular weight photoinitiator. Examples of specific initiators include, but are not limited to, Irgacure® 127, Irgacure® 379, Irgacure® 819, all commercially available from Ciba Specialty Chemicals, among others.

Optionally, the low molecular weight photoinitiator is present in the phase change ink in any desired or effective amount, in one embodiment at least about 0.5 percent by weight of the ink composition, and in another embodiment at least about 1 percent by weight of the ink composition, and in one embodiment no more than about 5 percent by weight of the ink composition, and in another embodiment no more than about 2.5 percent by weight of the ink composition, although the amount can be outside of these ranges.

In embodiments, the phase change ink can optionally contain a curable wax component that is miscible with the other components and that will polymerize with the curable monomer to form a polymer. Inclusion of the wax promotes an increase in viscosity of the ink as it cools from the jetting temperature.

Suitable examples of waxes include, but are not limited to, those that are functionalized with curable groups. The curable groups may include, but are not limited to, acrylate, methacrylate, alkene, allylic ether, epoxide and oxetane. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 706 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

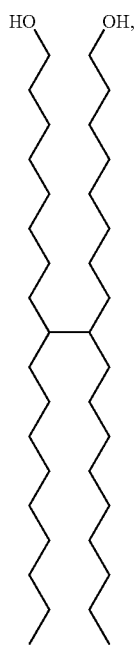

as well as other branched isomers which may include unsaturations and cyclic groups, available from Uniqema, New Castle, Del. Further information on C36 dimer diols of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3-(CH_2)_n-COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3—(CH_2)_n—COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

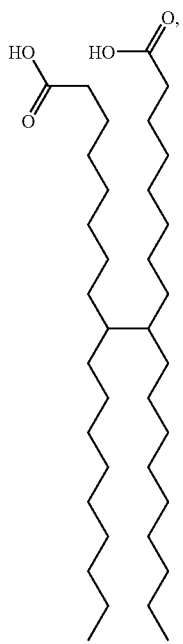

as well as other branched isomers which may include unsaturations and cyclic groups, available from Uniqema, New Castle, Del.; further information on C36 dimer acids of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

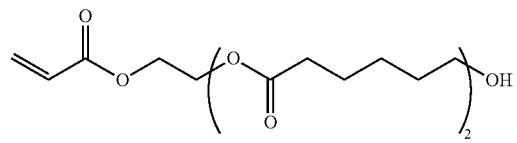

SR495B from Sartomer Company, Inc.;

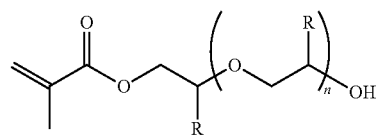

CD572 (R=H, n=10) and SR604 (R=Me, n=4) from Sartomer Company, Inc.

In embodiments, the optional curable wax is included in the ink in an amount of from, for example, about 1 to about 25% by weight of the ink, or from about 2 to about 20% by weight of the ink, or from about 2.5 to about 15% by weight of the ink, although the amounts can be outside of these ranges.

The curable monomer or prepolymer and curable wax together can form more than about 50% by weight of the ink, or at least 70% by weight of the ink, or at least 80% by weight of the ink, although not limited.

The ink vehicles disclosed herein can comprise any suitable curable monomer or prepolymer. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate such as SR9003, commercially available from Sartomer Co. Inc.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

Any suitable gellant can be used for the ink vehicles disclosed herein. In embodiments, a gellant such as described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, can be used, wherein the gellant is a compound of the formula

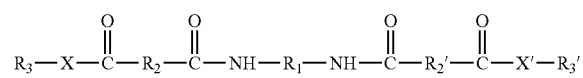

wherein $R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

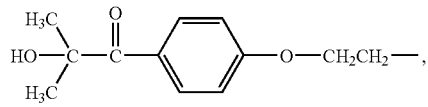

groups derived from 1-hydroxycyclohexylphenylketone, of the formula

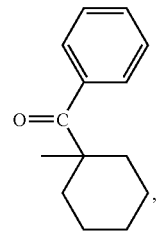

groups derived from 2-hydroxy-2-methyl-1-phenylpropan-1-one, of the formula

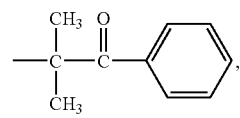

groups derived from N,N-dimethylethanolamine or N,N-dimethylethylenediamine, of the formula

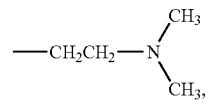

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than 60 carbon atoms, and in yet another embodiment with no more than about 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that at least one of $R_3$ and $R_3'$ is a photoinitiating group;

and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrite groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_2$ and $R_2'$ are the same as each other; in another specific embodiment, $R_2$ and $R_2'$ are different from each other. In one specific embodiment, $R_3$ and $R_3'$ are the same as each other; in another specific embodiment, $R_3$ and $R_3'$ are different from each other.

In one specific embodiment, $R_2$ and $R_2'$ are each groups of the formula —$C_{34}H_{56+a}$— and are branched alkylene groups which may include unsaturations and cyclic groups, wherein a is an integer of 0, 1, 2, 3, 4, 5, 6, 7, 8, 9, 10, 11, or 12, including (but not limited to) isomers of the formula

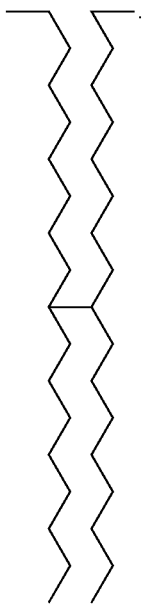

In one specific embodiment, $R_1$ is an ethylene (—$CH_2CH_2$—) group.

In one specific embodiment, $R_3$ and $R_3'$ are both

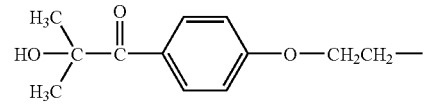

In one specific embodiment, the compound is of the formula
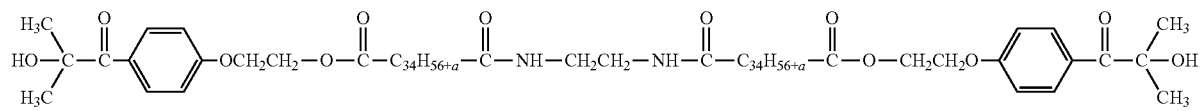
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, including (but not limited to) isomers of the formula
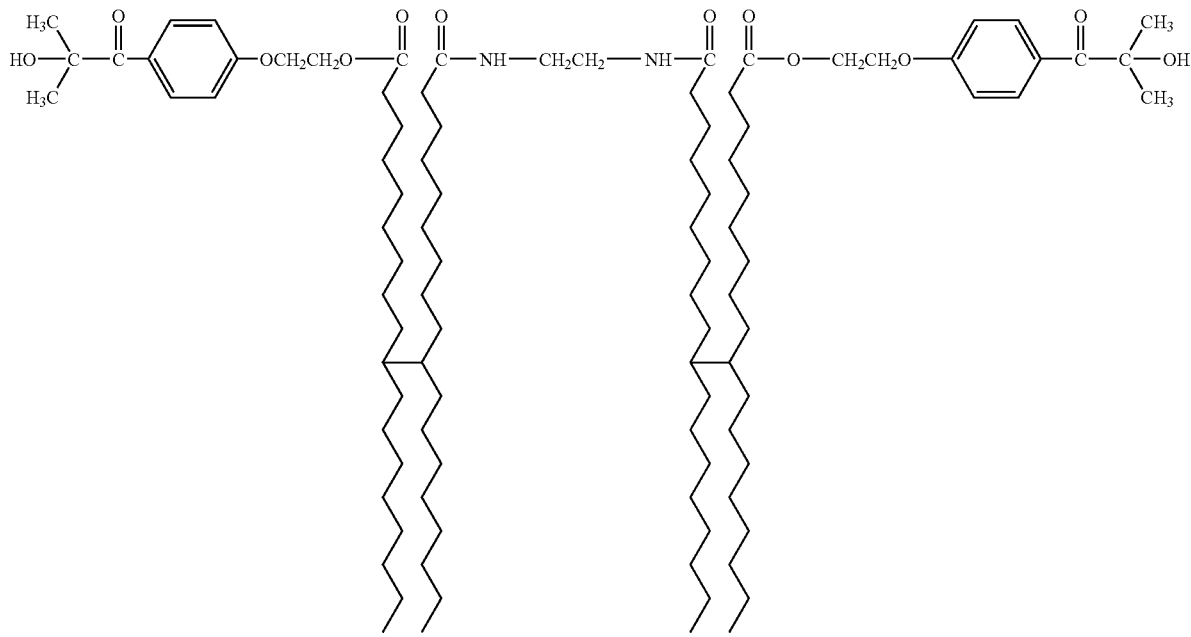

Additional specific examples of compounds of this formula include those of the formula
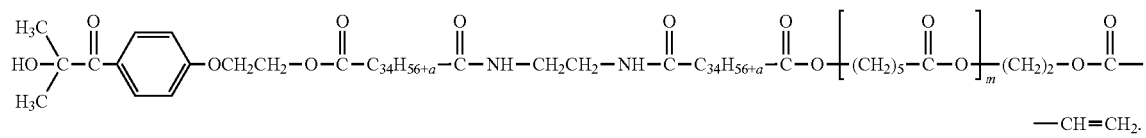
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to embodiments wherein m is 2, including (but not limited to) isomers of the formula
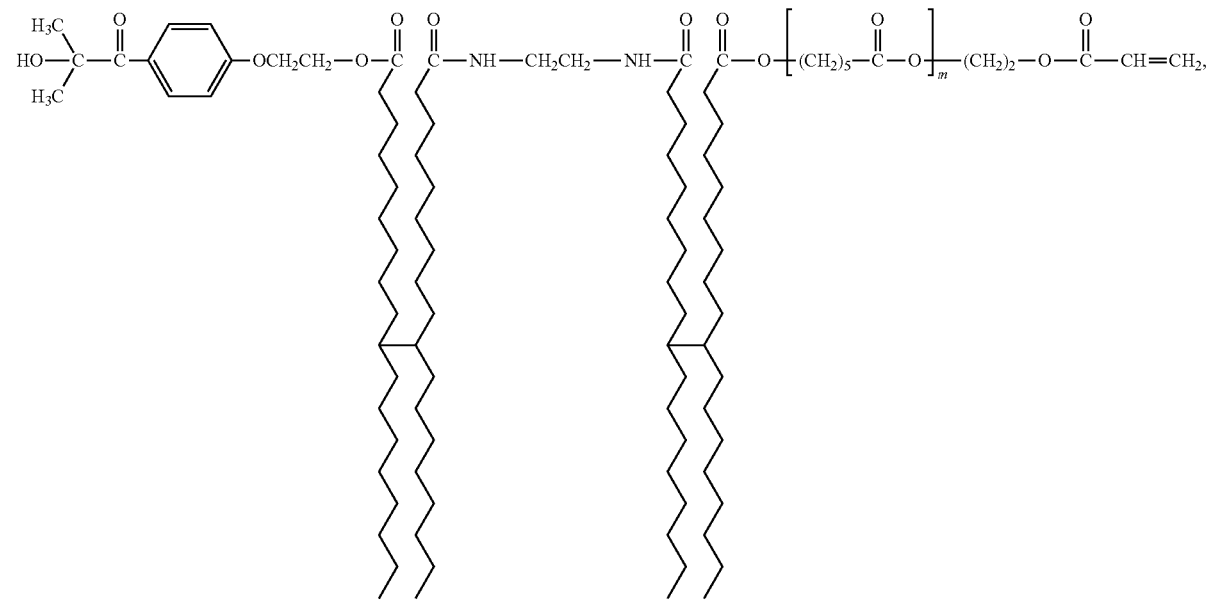

those of the formula
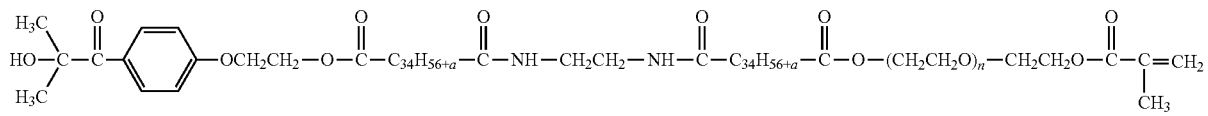
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including (but not limited to) isomers of the formula
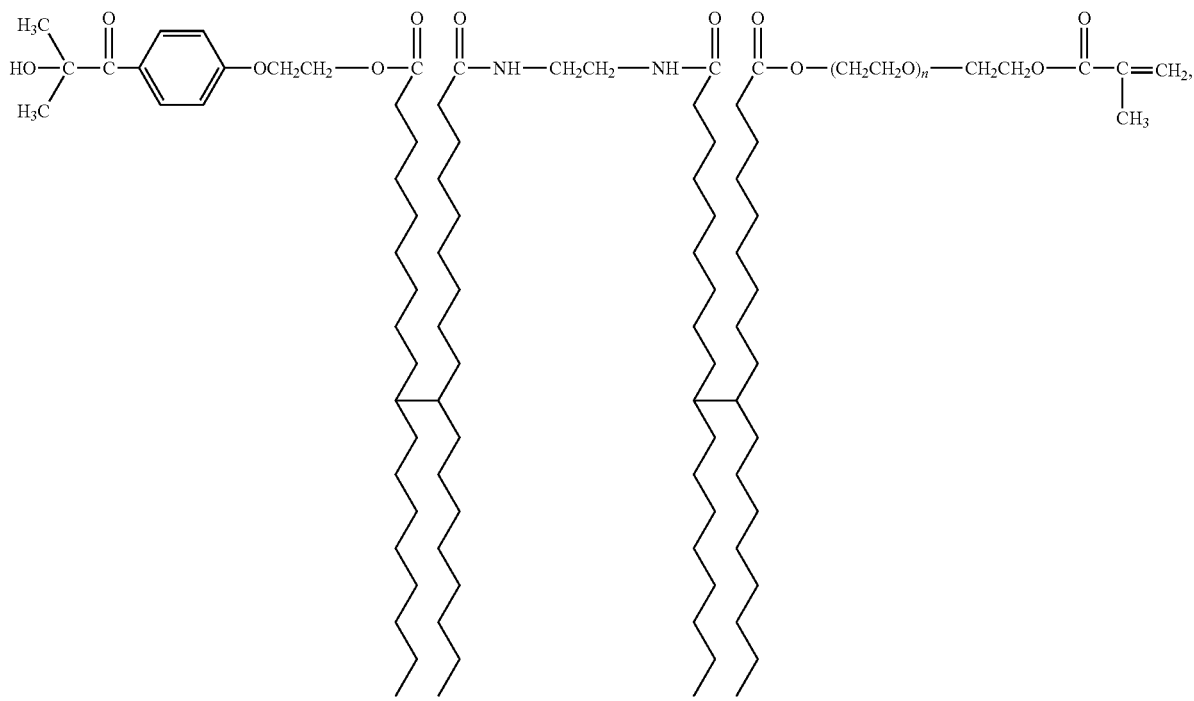

those of the formula
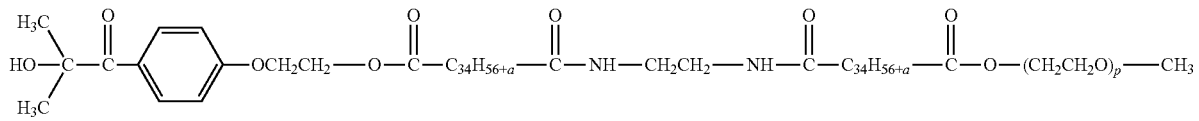
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including but not limited to embodiments wherein p is 2 and wherein p is 3, including (but not limited to) isomers of the formula
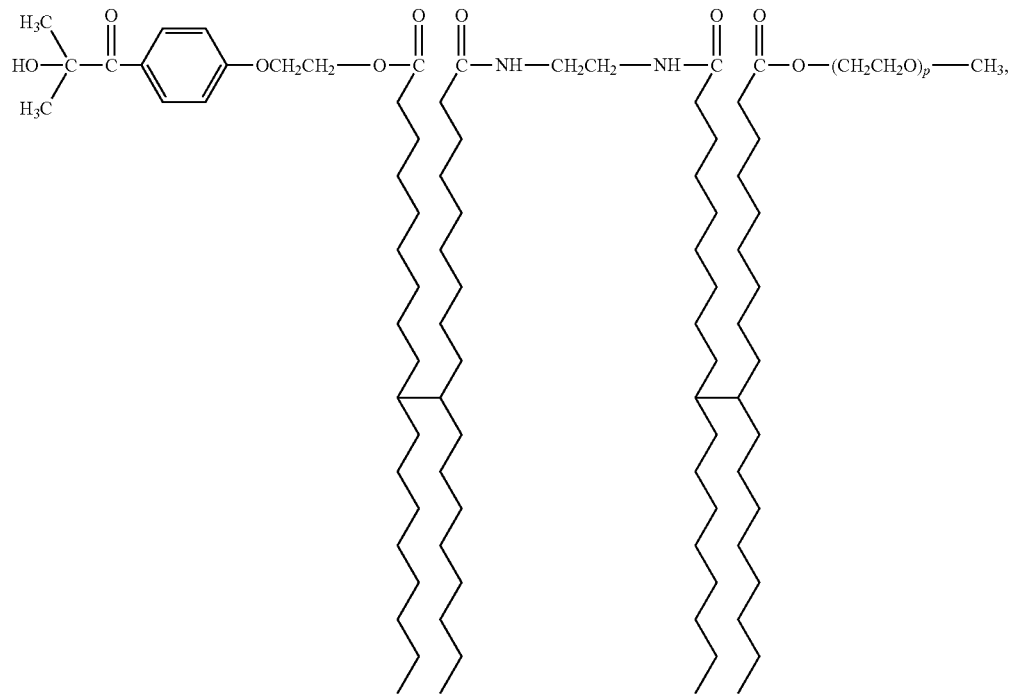
those of the formula
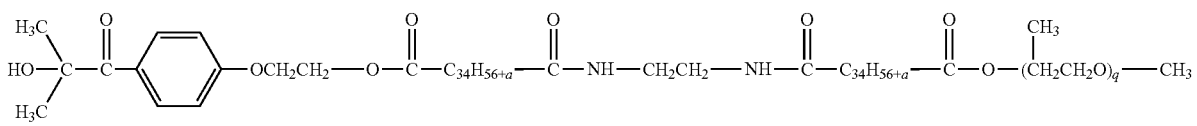

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including but not limited to embodiments wherein q is 2 and wherein q is 3, including (but not limited to) isomers of the formula
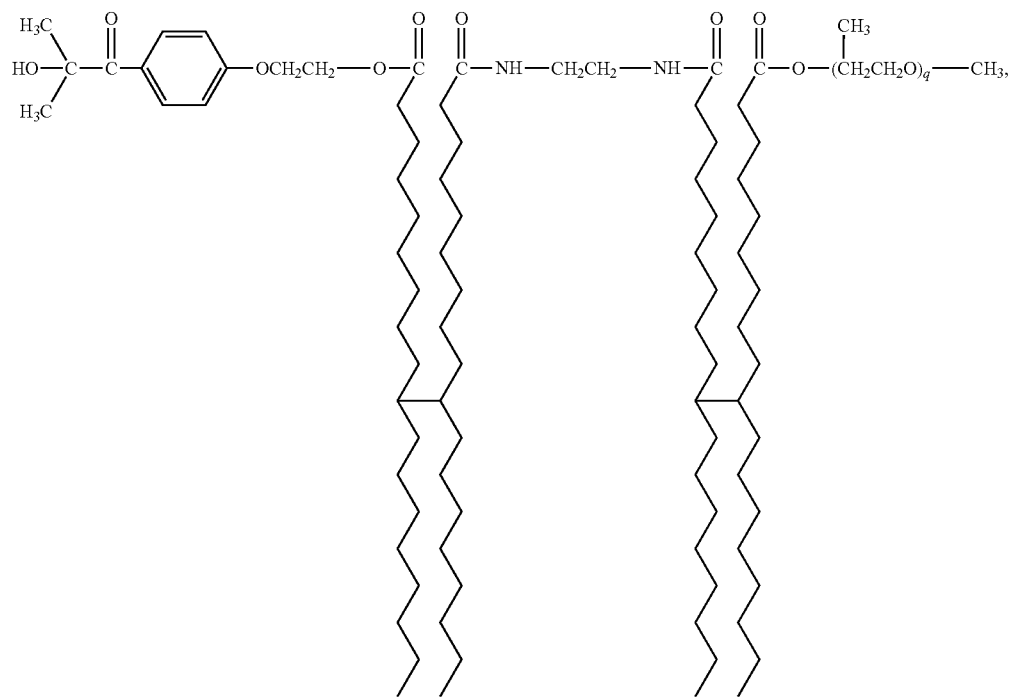
those of the formula
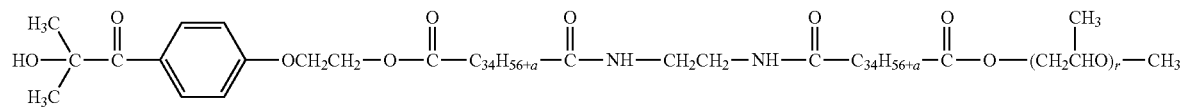

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, including but not limited to embodiments wherein r is 2 and wherein r is 3, including (but not limited to) isomers of the formula

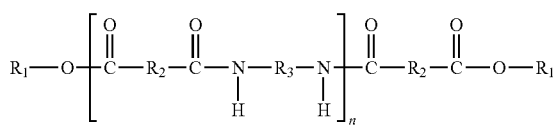

The gellant compounds as disclosed herein can be prepared by any desired or effective method.

For example, in embodiments, gellants can be prepared as described in copending application U.S. Ser. No. 11/290,328, filed Nov. 30, 2005, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference, which describes a process for preparing a compound of the formula wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups,

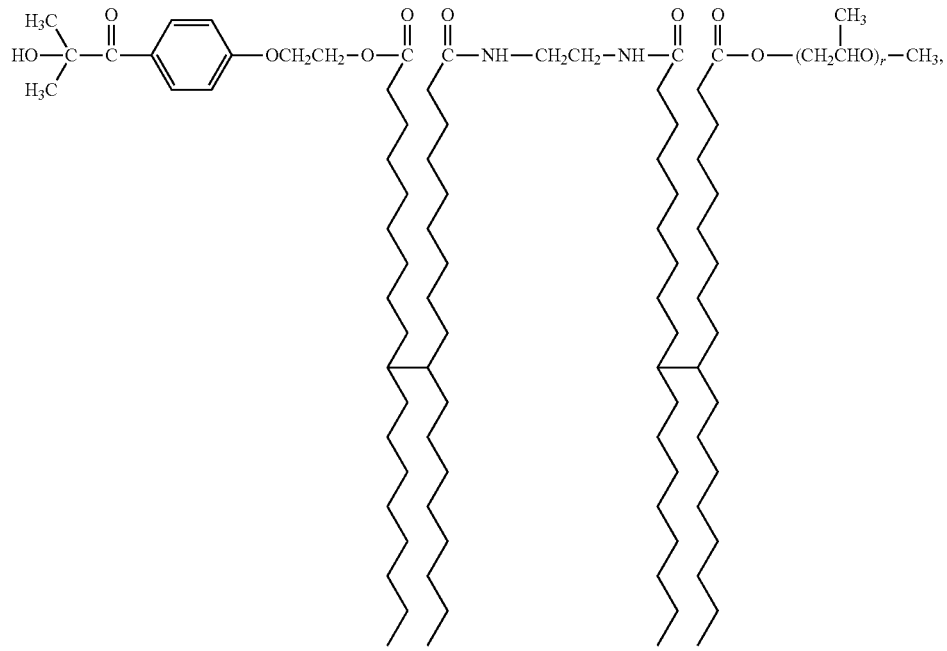

and the like, as well as mixtures thereof.

In embodiments, gellants herein can comprise materials disclosed in copending application U.S. Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is totally incorporated herein by reference, including a compound of the formula

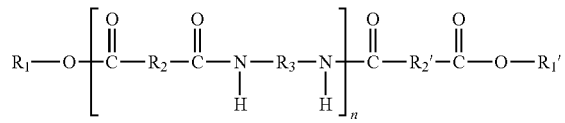

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1. or alkylarylene groups, and n is an integer representing the number of repeat amide units and is at least 1, said process comprising: (a) reacting a diacid of the formula $$HOOC—R_2—COOH$$

with a diamine of the formula

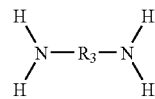

in the absence of a solvent while removing water from the reaction mixture to form an acid-terminated oligoamide intermediate; and (b) reacting the acid-terminated oligoamide intermediate with a monoalcohol of the formula $$R_1—OH$$

in the presence of a coupling agent and a catalyst to form the product.

In embodiments, the phase change ink compositions herein employ photoreactive polymers in combination with gellants to provide phase change ink compositions having the advantages described herein including reduction of penetration of monomers into porous substrates prior to final curing, reduction or elimination of the presence of post fusing extractable species, and facilitation of the tuning of the ink rheology independently form the monomer selection.

Any suitable dendrimer or hyperbranched polymer can be used in embodiments herein. In embodiments, photoreactive polymers having hyperbranched polymeric cores and viscosities suitable for use in phase change ink jet applications are selected. In further specific embodiments, the viscosities of the inks incorporating the photoreactive polymers are between from about 10 to about 12 centipoise at a temperature between from about 75° C. to about 120° C.

In embodiments, at least one hyperbranched polymer is present in an amount of from about 1 to about 25 percent by weight based upon the weight of the ink composition.

In embodiments, a radiation curable composition comprising a novel photoreactive polymer comprising a dendritic polymer core with at least one initiating functional group and at least one co-initiating functional group as described in U.S. Patent Publication 20060014852 (Loccufier et al.) the disclosure of which is totally incorporated herein by reference, can be selected for the phase change ink compositions herein. In embodiments, the photoreactive polymer for use in the phase change ink compositions herein include a dendritic polymeric core derivatized with at least one photoinitiator or derivative thereof and at least one co-initiator or derivative thereof. In another embodiment, the co-initiator may be part of the dendritic polymeric core, which is only derivatized with a photoinitiator or derivative thereof.

Any suitable photoinitiating moiety can be used in the hyperbranched polymer component of the phase change ink compositions herein. Suitable examples of photoinitiators that can be reacted with the hyperbranched polymer include

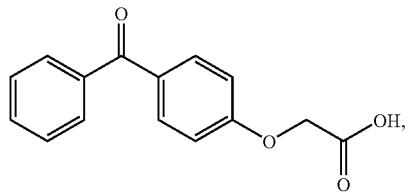

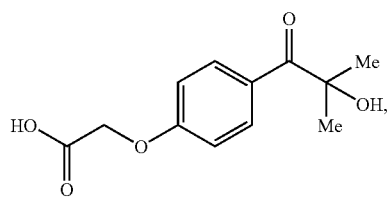

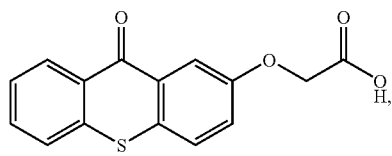

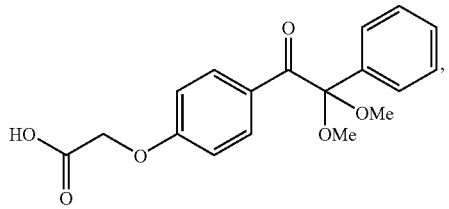

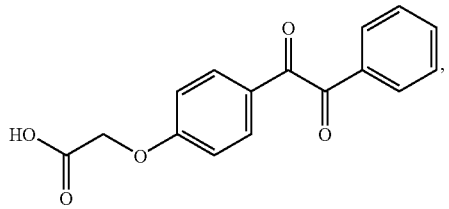

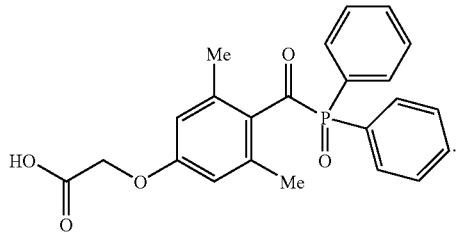

The hyperbranched polymer of the composition can be functionalized with any suitable co-initiating moiety. Examples of co-initiators that can be reacted with the dendritic core include:

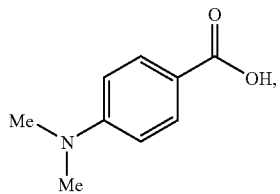

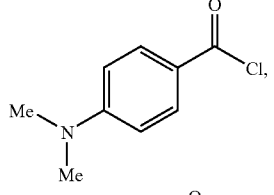

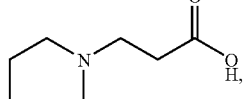

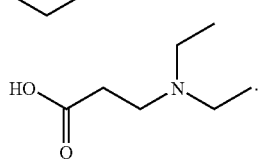

Any suitable compatibilizing moiety can be used in the hyperbranched polymer component of the phase change ink compositions herein to impart greater solubility of the photoreactive polymer in the ink vehicle. Suitable examples of compatibilizing compounds that can be reacted with the hyperbranched polymer include

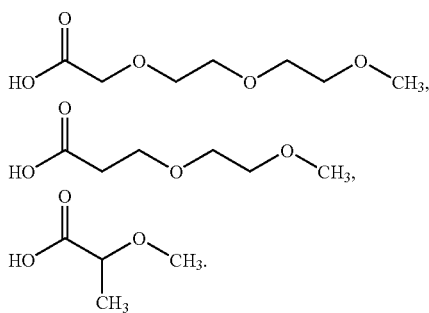

Suitable hyperbranched polymers are equipped with groups, such as hydroxyl and amine groups and the like, that can be functionalized to incorporate the photoinitiator, coinitiator and compatibilizing moieties. U.S. Patent Application 20060014852, the disclosure which is totally incorporated herein by reference, describes a number of hyperbranched polymers that are suitable for us in this application. To enable a jettable viscosity (i.e., from about 10 to about 12 centipoise at a temperature below about 120° C.), in a specific embodiment the hyperbranched polymers have a Mw smaller than about 20,000 g/mol, or smaller than about 10,000 g/mol, or more specifically smaller than about 5,000 g/mol. Although any hyperbranched polymer can be used, hyperbranched polyglycidols or hyperbranched copolymers of glycidol and other epoxides are selected in embodiments to form the photoreactive polymer. In embodiments, a suitable example of a hyperbranched polyglycerol comprises the structure polyesters, acrylated polyethers, acrylated epoxies, urethane acrylates, and pentaerythritol tetraacrylate, and mixtures and combinations thereof. Specific examples of suitable acrylated oligomers include, but are not limited to, acrylated polyester oligomers, such as CN2262 (Sartomer Co.), EB 812 (UCB Chemicals), CN2200 (Sartomer Co.), CN2300 (Sartomer Co.), and the like, acrylated urethane oligomers, such as EB270 (UCB Chemicals), EB 5129 (UCB Chemicals), CN2920 (Sartomer Co.), CN3211 (Sartomer Co.), and the like, acrylated epoxy oligomers, such as EB 600 (UCB Chemicals), EB 3411 (UCB Chemicals), CN2204 (Sartomer Co.), CN110 (Sartomer Co.), and the like; and pentaerythritol tetraacrylate oligomers, such as SR399LV (Sartomer Co.) and the like.

The total amount of optional curable oligomer included in the ink may be, for example, from about 0.5 to about 10%, or from about 1 to about 5%, by weight of the ink, although the amounts can be outside of these rangers.

Optionally, in embodiments, the phase change ink compositions comprise a low molecular weight photoinitiator. Any suitable low molecular weight photoinitiator can be selected for embodiments herein. As used herein, low molecular weight photoinitiator means a photoinitiator having a molecular weight of from about 100 to about 1000 or from about 100 to about 800. Specific examples of suitable low molecular weight photoinitiators include, but are not limited to, Irgacure® 127, Irgacure® 379, and Irgacure® 819, all commercially available from Ciba Specialty Chemicals, among others.

Examples of suitable optional low molecular weight photoinitiators include (but are not limited to) benzophenone

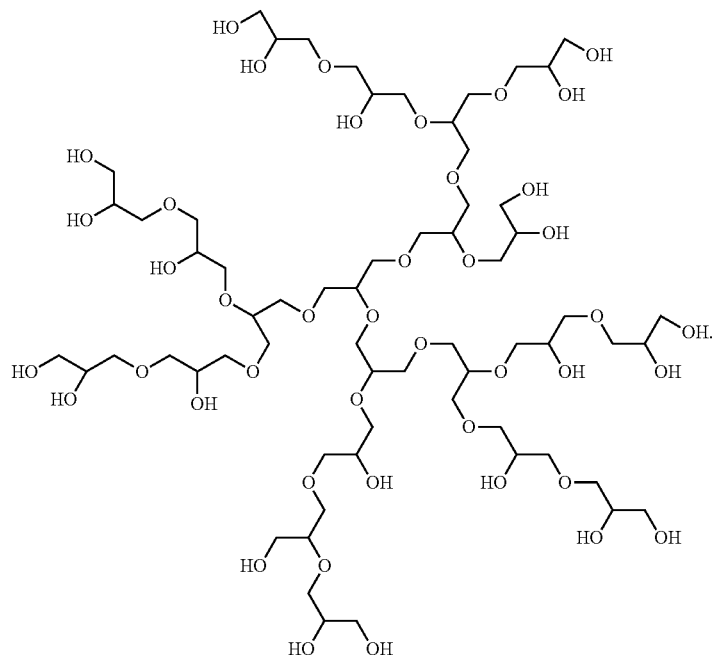

In a specific embodiment, an amount of the photoreactive polymer in the ink is selected at from about 1% to about 25% by weight or in another embodiment from about 1% to about 20% by weight.

Optionally, in embodiments, the phase change ink compositions herein further comprise a curable oligomer. Suitable curable oligomers include, but are not limited to, acrylated derivatives, benzyl ketones, monomeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, isopropyl thioxanthenones, arylsulphonium salts and aryl iodonium salts and the like, and mixtures and combinations thereof. Specific examples include 1-hydroxy-cyclohexylphenylketone, benzophenone, benzophenone derivatives, 2-benzyl-2-(dimethylamino)-1-(4-(4-morpholinyl)phenyl)-1-butanone, 2-methyl-1-(4-methylthio)phenyl-2-(4-morphorlinyl)-1-propanone, diphenyl-(2,4,6-trimethyl-benzoyl)phosphine oxide, phenyl bis(2,4,6-trimethylbenzoyl)phosphine oxide, benzyl-dimethylketal, isopropylthioxanthone, 2,4,6-trimethylbenzoyldiphenylphosphine oxide (available as BASF LUCIRIN TPO®), 2,4,6-trimethylbenzoylethoxyphenylphosphine oxide (available as BASF LUCIRIN TPO-L®), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino 1-(4-morpholinophenyl)butanone-1 (available as Ciba IRGACURE® 369), 2-hydroxy-1-(4-(4-(2-hydroxy-2-methylpropionyl)-benzyl)-phenyl)-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthenones, 1-hydroxy-cyclohexylphenylketone, benzophenone, 2,4,6-trimethylbenzophenone, 4-methylbenzophenone, diphenyl-(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, and the like, as well as mixtures thereof.

In embodiments, the optional at least one low molecular weight photoinitiator is present in an amount of from about 0.5 to about 5 percent by weight based upon the weight of the ink composition, although not limited.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the ink, and in another embodiment at least about 1 percent by weight of the ink, and in one embodiment no more than about 2.5 percent by weight of the ink, and in another embodiment no more than about 2 percent by weight of the ink, although the amount can be outside of these ranges.

The radiation curable phase change inks herein can also optionally contain an antioxidant. The optional antioxidants can protect the images from oxidation and can also protect the ink components from oxidation during the heating portion of the ink preparation process. Specific examples of suitable antioxidant stabilizers include (but are not limited to) NAUGARD® 524, NAUGARD® 635, NAUGARD® A, NAUGARD® 1-403, and NAUGARD® 959, commercially available from Crompton Corporation, Middlebury, Conn.; IRGANOX® 1010 and IRGASTAB® UV 10, commercially available from Ciba Specialty Chemicals; GENORAD 16 and GENORAD 40 commercially available from Rahn A G, Zurich, Switzerland, and the like, as well as mixtures thereof. When present, the optional antioxidant is present in the ink in any desired or effective amount, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

The radiation curable phase change inks can also, if desired, contain additives to take advantage of the known functionality associated with such additives. Such additives may include, for example, defoamers, slip and leveling agents, pigment dispersants, and the like, as well as mixtures thereof. The inks can also include additional monomeric or polymeric materials as desired.

Curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges. At such low jetting temperatures, the conventional use of temperature differential between the jetted ink and the substrate upon which the ink is jetted to effect a rapid phase change in the ink (i.e., from liquid to solid) may not be effective. The gellant can thus be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

It has been found that optimum transfer efficiency from an intermediate transfer surface to a final recording sheet and optimum print quality can be achieved if the viscosity of the ink image deposited on the intermediate transfer member is greatly increased after jetting the ink, so as to obtain a stable and transferable image that will not smear. A suitable gelling agent for the ink will gel the monomers/oligomers in the ink vehicle quickly and reversibly and will demonstrate a narrow phase change transition, for example within a temperature range of from about 30° C. to about 100° C., preferably of from about 30° C. to about 70° C., although the transition range can be outside of these temperature ranges. The gel state of the ink in one specific embodiment exhibits a minimum of $10^{2.5}$ centipoise, and in another specific embodiment $10^3$ centipoise, increase in viscosity at transferring temperatures, e.g., in one specific embodiment from about 30° C. to about 70° C., compared to the viscosity at the jetting temperature. One specific embodiment is directed to gellant containing inks that rapidly increase in viscosity within from about 5° C. to about 10° C. below the jetting temperature and ultimately reach a viscosity above $10^4$ times the jetting viscosity, and in another embodiment about $10^5$ times the jetting viscosity, although the viscosity can be outside of these ranges.

When the inks are in the gel state, the viscosity of the ink is in one embodiment at least about 1,000 centipoise, in another embodiment at least about 10,000 centipoise, and in yet another embodiment at least about 100,000 centipoise, although the viscosity can be outside of these ranges. Viscosity values in the gel state are in one embodiment at least about $10^3$ centipoise, and in another embodiment at least about $10^{4.5}$ centipoise, and in one embodiment no more than about $10^9$ centipoise, and in another embodiment no more than about $10^{6.5}$ centipoise, although the gel state viscosity can be outside of these ranges. The preferred gel phase viscosity can vary with the print process. For example, the highest viscosities are preferred when employing intermediate transfer, or when jetting directly to porous paper in order to minimize the effects of ink bleed and feathering. On the other hand, less porous substrates such as plastic may lead to the use of lower ink viscosities that control dot gain and agglomeration of individual ink pixels. The gel viscosity can be controlled by ink formulation and substrate temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation.

For printing applications wherein the ink is printed onto an intermediate transfer member and subsequently transferred to a final substrate, the viscosity of the ink in one specific embodiment increases to about $10^6$ centipoise or greater at the intermediate transfer member temperature to facilitate adhesion to the intermediate transfer member, and for printing applications wherein the ink is printed directly onto a final substrate, the viscosity of the ink in one specific embodiment increases to $10^6$ centipoise or greater at the final substrate temperature to prevent the ink from soaking into the final substrate and/or to facilitate adhesion to the final substrate until curing by exposure to radiation. In one specific embodiment, the temperature of the intermediate transfer member or the final substrate onto which the ink is printed and at which the ink viscosity increases to about $10^6$ centipoise or greater is about 50° C. or lower.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20° C. to about 25° C.). The inks are solid at ambient temperature.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

TABLE 1

Composition of Prophetic Examples 1-8

| Component | Ink, weight percent | | | | | | | |
|---|---|---|---|---|---|---|---|---|
| | 1 | 2 | 3 | 4 | 5 | 6 | 7 | 8 |
| SR-9003 ™[a] | 65.3 | 65.3 | 65.3 | 65.3 | 60.3 | 60.3 | 60.3 | 60.3 |
| Amide Gellant[b] | 7.5 | 7.5 | 7.5 | 7.5 | 7.5 | 7.5 | 7.5 | 7.5 |
| Unilin ™ 350-acrylate[c] | 0 | 0 | 0 | 0 | 5.0 | 5.0 | 5.0 | 5.0 |
| PP1[d] | 15 | 0 | 0 | 0 | 15 | 0 | 0 | 0 |
| PP2[d] | 0 | 15 | 0 | 0 | 0 | 15 | 0 | 0 |
| PP3[d] | 0 | 0 | 15 | 0 | 0 | 0 | 15 | 0 |
| PP4[d] | 0 | 0 | 0 | 15 | 0 | 0 | 0 | 15 |
| Irgastab ® UV10[e] | 0.2 | 0.2 | 0.2 | 0.2 | 0.2 | 0.2 | 0.2 | 0.2 |
| Sun Blue pigment dispersion, 25 wt % | 12 | 12 | 12 | 12 | 12 | 12 | 12 | 12 |

TABLE 2

Composition of Ink Prophetic Examples 9-14

| Component | Ink, Weight Percent | | | | | |
|---|---|---|---|---|---|---|
| | 9 | 10 | 11 | 12 | 13 | 14 |
| SR-9003 ™[a] | 63 | 58.3 | 66 | 58 | 53.3 | 61 |
| Amide Gellant[b] | 7.5 | 7.5 | 7.5 | 7.5 | 7.5 | 7.5 |

TABLE 2-continued

Composition of Ink Prophetic Examples 9-14

| Component | Ink, Weight Percent | | | | | |
|---|---|---|---|---|---|---|
| | 9 | 10 | 11 | 12 | 13 | 14 |
| Unilin ™ 350-acrylate[c] | 0 | 0 | 0 | 5.0 | 5.0 | 5.0 |
| PP4[d] | 15 | 15 | 15 | 15 | 15 | 15 |
| Irgastab ® UV10[e] | 0.2 | 0.2 | 0.2 | 0.2 | 0.2 | 0.2 |
| Sun Magenta pigment dispersion, 21 wt % | 14.3 | 0 | 0 | 14.3 | 0 | 0 |
| Sun Yellow pigment dispersion, 16 wt % | 0 | 19 | 0 | 0 | 19 | 0 |
| Sun Black pigment dispersion, 26.5 wt % | 0 | 0 | 11.3 | 0 | 0 | 11.3 |

[a] SR-9003™ is a propoxylated (2) neopentyl glycol diacrylate monomer available from Sartomer Company, Inc.

[b] The amide gellant is a mixture of

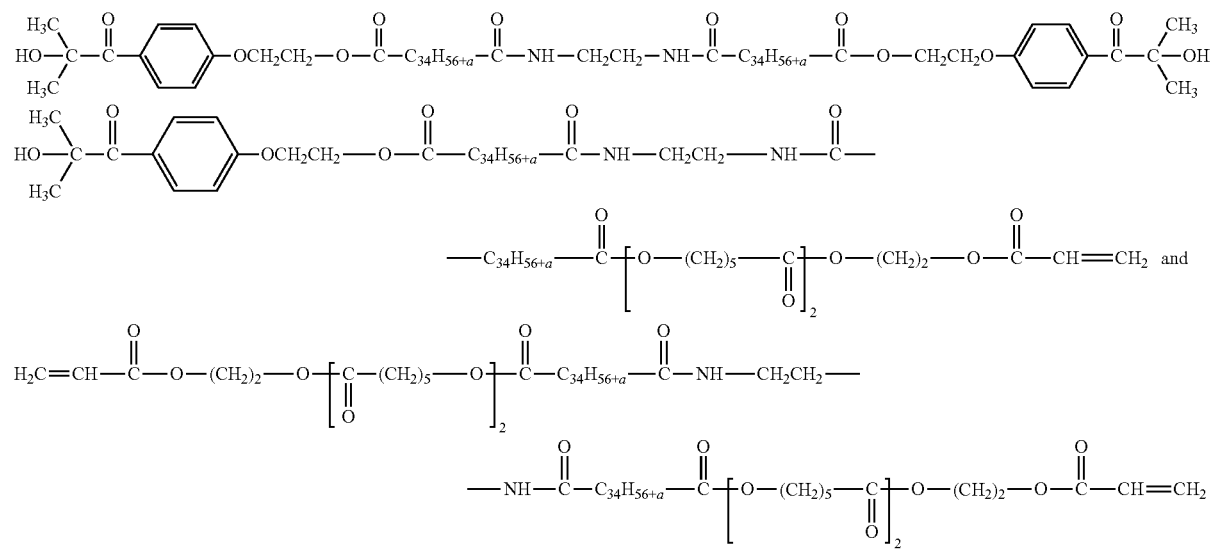

wherein —$C_{34}H_{56+a}$— represents a branched alkylene group, which may or may not include unsaturations and cyclic groups, substituted and unsubstituted alkylene groups, and wherein heteroatoms either may or may not be present in the alkylene group, wherein a is an integer of 0, 1, 2, 3, 4, 5, 6, 7, 8, 9, 10, 11, or 12. The synthesis of this gellant is described in U.S. Patent Application of Jennifer L. Belelie, et al., entitled "Method for Preparing Curable Amide Gellant Compounds," application Ser. No. 11/290,328, filed Nov. 30, 2005, which is totally incorporated by reference herein.

[c] The synthesis of Unilin™ 350-acrylate is described in U.S. Patent Application of Jennifer L. Belelie, et al., entitled "Radiation Curable Ink Containing A Curable Wax," application Ser. No. 11/289,615, filed Nov. 30, 2005, which is totally incorporated by reference herein. Preparation of UNILIN™ 350 acrylate: UNILIN™ 350 is a hydroxyl-terminated polyethylene wax available from Baker-Petrolite (Sand Springs, Okla.). It has an Mn approximately equal to 375 g/mol. UNILIN™ 350-acrylate is an acrylate-modified wax based on UNILIN™ 350. UNILIN™ 350-acrylate was prepared as follows: To a 2 L three neck flask equipped with a reflux condenser, dropping funnel, thermometer, and Dean-Stark trap was added UNILIN™ 350 (200 g, hydroxyl number 125.80 mg KOH/g, 80 wt %, obtained from Baker Petrolite, Tulsa, Okla.), p-toluenesulfonic acid (1.99 g, 0.8 wt %, obtained from Sigma-Aldrich Co., Milwaukee, Wis.), hydroquinone (0.25 g, 0.1 wt %, obtained from Sigma-Aldrich Co., Milwaukee, Wis.) and toluene (600 mL). The reaction mixture was heated until dissolved. Acrylic acid (46 mL, 19 wt %) was added slowly by the addition funnel. The reaction was allowed to reflux until water ceased collecting in the Dean-Stark trap. Completion of the reaction was confirmed by $^1$H NMR spectroscopy in toluene-$d_8$ (80° C.): the methylene protons adjacent to the hydroxyl group ($\delta$3.38, t) were consumed and replaced by a series of triplets between $\delta$4.27 and 3.97, representing $RCH_2CH_2OOCCH:CH_2$. At the end of the reaction, the mixture was cooled to room temperature and filtered. The solid was reslurried with methanol, filtered, and dried in a vacuum oven. The toluene filtrate was concentrated in vacuo, reslurried with cold methanol, filtered, and dried in a vacuum oven. In total, 156 g of a yellow solid (broad mp ca. 50° C.) was recovered. $^1$H NMR (300 MHz, toluene-$d_8$, 80° C.) $\delta$ 6.29-6.19 (1H, $dd_1$, $J_{dd1}$=17.3, 1.7 Hz and $dd_2$, $J_{dd2}$=17.3, 1.7 Hz), 6.03-5.94 (1H, $dd_1$, $J_{dd1}$=17.3, 10.4 Hz and $dd_2$, $J_{dd2}$=17.3, 10.4 Hz), 5.36-5.33 (1H, $dd_1$, $J_{dd1}$=10.4, 1.7 Hz and $dd_2$, $J_{dd2}$=10.4, 1.7 Hz), 4.27 (0.6H, t, J=6.5 Hz), 4.21 (0.3H, t, J=6.4 Hz), 4.06-3.96 (2.5H, $t_1$, $J_{t1}$=6.7 Hz and $t_2$, $J_{t2}$=6.7 Hz), 2.42-2.29 (0.9H, m), 2.28-2.16 (0.4H, m), 1.65-1.43 (3.6H, m), 1.43-1.25 (104H, m), 0.91 (5.8H, t, J=6.5 Hz).

[d] wherein PP1, PP2 and PP3 are of the general formula

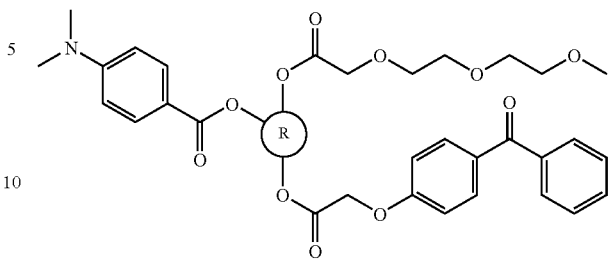

where in PP1 R is a hyperbranched polyglycidol with about 17 hydroxyl groups, where in PP2 R is a hyperbranched polyglycidol with about 33 hydroxy groups, both commercially available from Hyperpolymers GMBH, Freiburg, Germany; where in PP3 R is a dendritic polymer polyol, Boltom® H$_2$O, functionality 16 and Mw 2100 (determined by GPC), available from Perstorp Specialty Chemicals, Perstorp A B, Sweden. The synthesis of these photoreactive polymers is described in U.S. Patent Application Publication Number 20060014852, the disclosure of which is completely incorporated herein by reference.

wherein PP4 is of the general structure

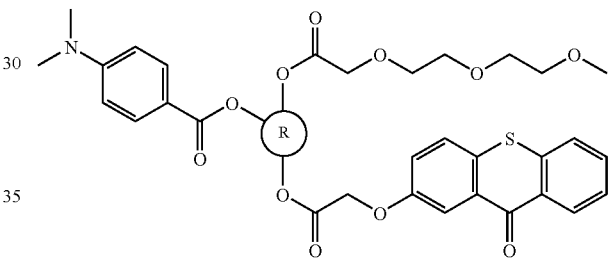

where in PP4, R is a hyperbranched polyglycidol with about 33 hydroxy groups, commercially available from Hyperpolymers GMBH, Freiburg, Germany.

[e] Irgastab® UV-10 is radical scavenger available from Ciba® Specialty Chemicals, Inc.

TABLE 3

Description of Photoreactive Polymer Compositions PP1-PP4[a]

| Photoreactive Polymer | Ratio of Groups Acrylated Onto the Hyperbranched Polymer Core | | | | | General Formula |
|---|---|---|---|---|---|---|
| | DMBA[b] | MEEA[c] | BP[d] | DB[e] | TA[f] | |
| PP1 | 4.8 | 7.4 | 4.8 | 0 | 0 | $PG_{17}BP_{4.8}DMBA_{4.8}MEEA_{7.4}$ |
| PP2 | 9.3 | 12.3 | 11.4 | 0 | 0 | $PG_{33}BP_{11.4}DMBA_{9.3}MEEA_{12.3}$ |
| PP3 | 0 | 3.2 | 5.9 | 6.9 | 0 | $BH_{16}PB_{5.9}DB_{6.9}MEEA_{3.2}$ |
| PP4 | 9.3 | 14.8 | 0 | 0 | 8.9 | $PG_{33}TA_{8.9}DB_{9.3}MEEA_{14.8}$ |

[a]PP1-PP4 are described in noted above under Table 2. PG represents a hyperbranched polyglycidol core, PG$_{17}$ represents a hyperbranched polyglycidol with 17 hydroxyl groups on average, and PG$_{33}$ represents a hyperbranched polyglycidol with 33 hydroxyl groups on average. The synthesis of PP1-PP4 is described in U.S. Patent Application of Johan Loccufier et al., entitled "Novel Radiation Curable Compositions," Application Ser. No. 11/170,016, filed Jun. 29, 2005, Publication Date Jan. 19, 2006, which is totally incorporated by reference herein.
[b]wherein DMBA is 4-dimethylaminobenzoic acid
[c]wherein MEEA is 2-[2-(2-methoxyethoxy)ethoxy]acetic acid
[d]wherein BP is p-benzophenoxyacetic acid
[e]wherein DB is 4-dimethylaminobenzoyl chloride
[f]wherein TA is carboxythioxanthone It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
(a) at least one curable monomer or prepolymer, (b) at least one gellant, wherein the gellant is a mixture of

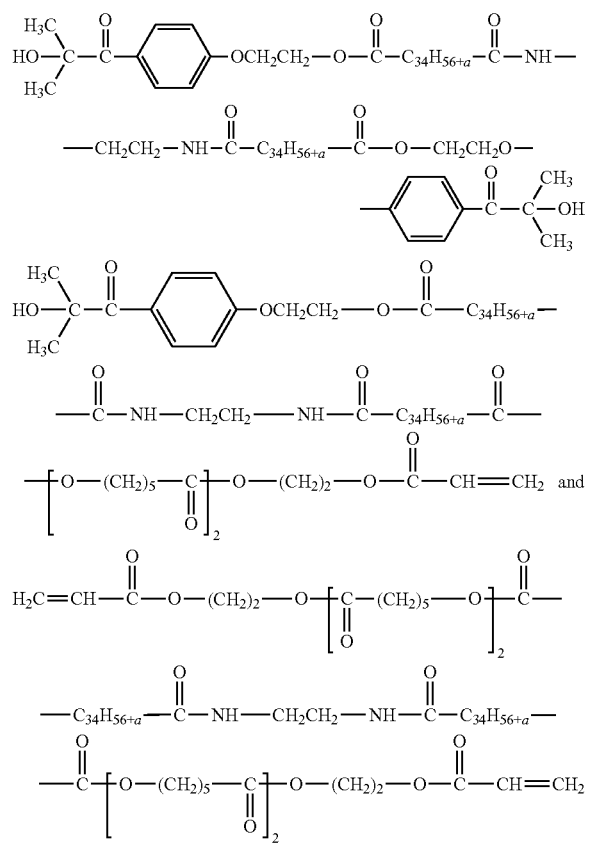

wherein —$C_{34}H_{56+a}$— represents a branched alkylene group, which may or may not include unsaturations and cyclic groups, substituted and unsubstituted alkylene groups, and wherein heteroatoms either may or may not be present in the alkylene group, wherein a is an integer of 0, 1, 2, 3, 4, 5, 6, 7, 8, 9, 10, 11, or 12, (c) at least one hyperbranched polymer comprising at least one photoinitiating moiety, (d) a colorant (e) optionally, a reactive oligomer; and (f) optionally, at least one low molecular weight photoinitiator.

2. The phase change ink composition of claim 1, wherein the colorant comprises a pigment.

3. The phase change ink composition of claim 1, wherein the colorant is present in the ink composition in an amount of at least about 0.1 percent by weight of the ink composition to no more than about 8 percent by weight of the ink composition.

4. The phase change ink composition of claim 1, further comprising a wax containing at least one acrylate.

5. The phase change ink composition of claim 1, wherein the at least one curable monomer is propoxylated neopentyl glycol diacrylate, isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, or mixtures and combinations thereof.

6. The phase change ink composition of claim 1, wherein the at least one curable monomer or prepolymer is a multifunctional acrylate or methacrylate compound.

7. The phase change ink composition of claim 6, wherein the multifunctional acrylate or methacrylate compound is propoxylated neopentyl glycol diacrylate, pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, hexanediol diacrylate, tripropylene glycol diacrylate, dipropylene glycol diacrylate, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, or mixtures or combinations thereof.

8. The phase change ink composition of claim 1, wherein the at least one hyperbranched polymer comprises at least one initiating functional group, at least one co-initiating functional group and at least one compatibilizing group.

9. The phase change ink composition of claim 1, wherein the at least one hyperbranched polymer is a compound of the formula

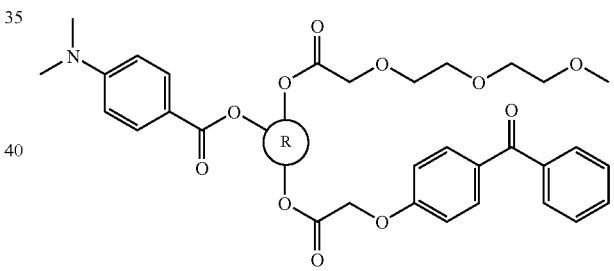

wherein R is a hyperbranched polyglycidol or a dendritic polymer polyol.

10. The phase change ink composition of claim 1, wherein the at least one hyperbranched polymer is a compound of the formula

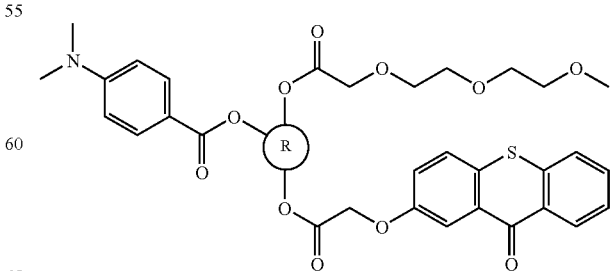

wherein R is a hyperbranched polyglycidol.

11. The phase change ink composition of claim 1, wherein the at least one hyperbranched polymer is present in an amount of from about 1 to about 25 percent by weight based upon the weight of the ink composition.

12. The phase change ink composition of claim 1, wherein the optional reactive oligomer comprises acrylated polyesters, acrylated polyethers, acrylated epoxies, urethane acrylates, pentaerythritol tetraacrylate, or a mixture or combination thereof.

13. The phase change ink composition of claim 1, wherein the optional reactive oligomer is present in an amount of from about 0.5 to about 10 percent by weight based upon the weight of the ink composition.

14. The phase change ink composition of claim 1, wherein the optional at least one low molecular weight photoinitiator is selected from the group consisting of benzyl ketones, monomeric hydroxyl ketones, α-amino ketones, acyl phosphine oxides, metallocenes, benzophenone, benzophenone derivatives, isopropyl thioxanthenones, arylsulphonium salts and aryl iodonium salts.

15. The phase change ink composition of claim 1, wherein the optional at least one low molecular weight photoinitiator is present in an amount of from about 0.5 to about 5 percent by weight based upon the weight of the ink composition.

16. A process which comprises (I) incorporating into an ink jet printing apparatus a phase change ink composition comprising (a) at least one curable monomer or prepolymer, (b) at least one gellant, wherein the gellant is a mixture of

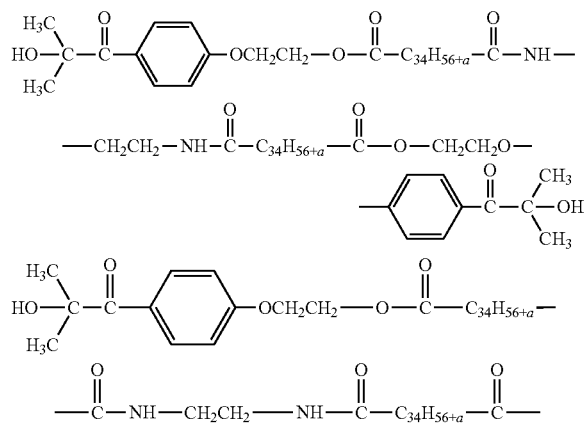

-continued

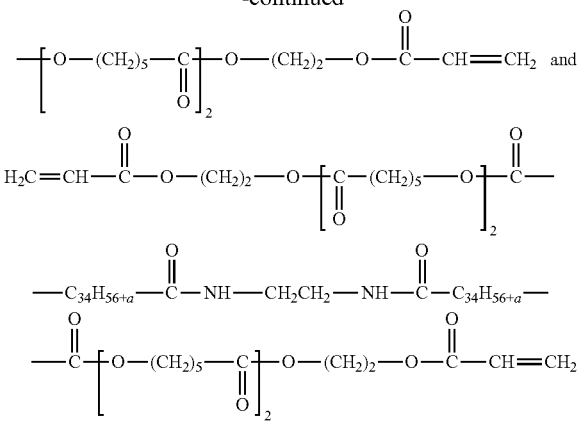

wherein —$C_{34}H_{56+a}$— represents a branched alkylene group, which may or may not include unsaturations and cyclic groups, substituted and unsubstituted alkylene groups, and wherein heteroatoms either may or may not be present in the alkylene group, wherein a is an integer of 0, 1, 2, 3, 4, 5, 6, 7, 8, 9, 10, 11, or 12, (c) at least one hyperbranched polymer comprising at least one photoinitiating moiety, (d) a colorant (e) optionally, a reactive oligomer; and (f) optionally, at least one low molecular weight photoinitiator; (II) melting the ink; (III) causing droplets of the melted ink to be ejected in an imagewise pattern onto a substrate; and (IV) exposing the imagewise pattern to ultraviolet radiation.

17. A process according to claim 16 wherein the substrate is a final recording sheet and droplets of the melted ink are ejected in an imagewise pattern directly onto the final recording sheet and the imagewise pattern on the final recording sheet is exposed to ultraviolet radiation.

18. A process according to claim 16 wherein the substrate is an intermediate transfer member and droplets of the melted ink are ejected in an imagewise pattern onto the intermediate transfer member followed by transfer of the imagewise pattern from the intermediate transfer member to a final recording sheet, and wherein the imagewise pattern on the final recording sheet is exposed to ultraviolet radiation.

19. A process according to claim 18 wherein the intermediate transfer member is heated to a temperature above that of the final recording sheet and below that of the melted ink in the printing apparatus.

\* \* \* \* \*